(12) United States Patent
Essawy et al.

(10) Patent No.: US 10,620,342 B2
(45) Date of Patent: Apr. 14, 2020

(54) MICROSCOPIC IMAGER FOR AIRCRAFT CLOUD CONDITION DETECTION

(71) Applicant: Rosemount Aerospace Inc., Burnsville, MN (US)

(72) Inventors: Magdi A Essawy, Lakeville, MN (US); Mark Ray, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 111 days.

(21) Appl. No.: 15/718,605

(22) Filed: Sep. 28, 2017

(65) Prior Publication Data
US 2019/0094415 A1 Mar. 28, 2019

(51) Int. Cl.
| | | |
|---|---|---|
| G01W 1/14 | (2006.01) | |
| H04N 5/225 | (2006.01) | |
| G01N 15/14 | (2006.01) | |
| G06T 7/00 | (2017.01) | |
| F21V 9/30 | (2018.01) | |
| G01S 17/02 | (2020.01) | |
| G01S 7/481 | (2006.01) | |
| G01S 7/4863 | (2020.01) | |
| G01S 17/95 | (2006.01) | |
| G01S 7/48 | (2006.01) | |
| G01S 7/484 | (2006.01) | |

(52) U.S. Cl.
CPC .............. *G01W 1/14* (2013.01); *F21V 9/30* (2018.02); *G01N 15/1429* (2013.01); *G01N 15/1475* (2013.01); *G01S 7/4802* (2013.01); *G01S 7/484* (2013.01); *G01S 7/4812* (2013.01); *G01S 7/4814* (2013.01); *G01S 7/4863* (2013.01); *G01S 17/02* (2013.01); *G01S 17/95* (2013.01); *G06T 7/0002* (2013.01); *H04N 5/2256* (2013.01); *G06T 2207/10032* (2013.01); *G06T 2207/30192* (2013.01)

(58) Field of Classification Search
CPC ....... G01W 1/14; F21V 9/30; G01N 15/1429; G01N 15/1475; G06T 7/0002; H04N 5/2256
USPC .......................................... 348/144
See application file for complete search history.

(56) References Cited

U.S. PATENT DOCUMENTS 6,091,335 A * 7/2000 Breda .................... B64D 15/20
 244/134 F
7,391,557 B1 6/2008 Bruch et al.
(Continued)

OTHER PUBLICATIONS

Extended European Search Report for EP Application No. 18197258.9, dated Mar. 7, 2019, pp. 5.

*Primary Examiner* — Joseph G Ustaris
*Assistant Examiner* — Matthew David Kim
(74) *Attorney, Agent, or Firm* — Kinney & Lange, P.A.

(57) ABSTRACT

An aircraft system is configured to detect conditions of a cloud. The aircraft system includes a laser emitter, a fluorescent filter, optics, and an imager. The laser emitter generates a short pulse laser beam. The fluorescent filter is configured to convert the short pulse laser beam into a short pulse light beam such that the spectral content of the short pulse light beam is greater than the spectral content of the short pulse laser beam. The optics are configured to direct the short pulse light beam through a window of the aircraft into the cloud. The imager is configured to receive a reflected portion of the short pulse light beam from the cloud, and process the images to detect the cloud particles of interest.

26 Claims, 4 Drawing Sheets

(56) References Cited

U.S. PATENT DOCUMENTS

| | | |
|---|---|---|
| 8,338,785 B2 | 12/2012 | Ray |
| 9,304,081 B2 | 4/2016 | Renno |
| 9,784,887 B1 * | 10/2017 | Ulmer .................... G01W 1/02 |
| 2011/0019188 A1 * | 1/2011 | Ray ........................ B64D 15/20 356/342 |
| 2012/0309080 A1 * | 12/2012 | Cunningham ....... G01N 21/658 435/288.7 |
| 2015/0346474 A1 * | 12/2015 | Iguchi ................ G02B 21/0076 359/385 |
| 2017/0082736 A1 | 3/2017 | Hofmann et al. |

* cited by examiner

MICROSCOPIC IMAGER FOR AIRCRAFT CLOUD CONDITION DETECTION

BACKGROUND

The present disclosure relates generally to cloud condition sensing, and in particular to a microscopic imager for an aircraft.

Aircraft are often exposed to extreme weather conditions, which can include severe icing and ice crystal conditions. These conditions can lead to ice ingestion in engine pathways, ice entrapment in moving joints, and ice accumulation on aircraft control services. This can lead to issues with the flight of the aircraft such as engine flameout, increased drag, loss of lift, and/or other issues. Of particular interest are super cooled large water droplets (SLD). SLDs pose a risk to aircraft systems due to their ability to quickly turn into accumulated ice on aircraft surfaces. It is desirable to provide an accurate methodology for detection and quantification of cloud icing conditions, particularly those that include SLDs.

SUMMARY

In one example, an imaging system for determining conditions of a cloud includes a laser emitter, a fluorescent filter, optics, and an imager. The laser emitter generates a short pulse laser beam. The fluorescent filter is configured to convert the short pulse, limited band, laser beam into a short pulse, wide band, light beam such that the spectral content of the short pulse light beam is greater than the spectral content of the short pulse laser beam. The optics are configured to direct the short pulse, wide band, light beam to the cloud, receive a reflected portion of the short pulse light beam from the cloud, and direct the reflected portion to the imager.

In another example, a method of detecting conditions of a cloud includes emitting, by a laser emitter, a short pulse laser beam; converting, by a fluorescent filter, the short pulse laser beam into a short pulse, wide band, light beam having a greater spectral content than the short pulse laser beam; directing the short pulse light beam into the cloud; receiving, by optics, a reflected portion of the short pulse light beam reflected by the cloud; and directing, by the optics, the reflected portion to an imager.

In another example, an aircraft system is configured to detect conditions of a cloud. The aircraft system includes a laser emitter, a fluorescent filter, optics, an imager, and processing electronics. The laser emitter generates a short pulse laser beam. The fluorescent filter is configured to convert the short pulse laser beam into a short pulse, wide band, light beam such that the spectral content of the short pulse light beam is greater than the spectral content of the short pulse laser beam. The optics are configured to direct the short pulse light beam through a window of the aircraft into the cloud. The imager is configured to receive a reflected portion of the short pulse light beam from the cloud. The processing electronics are configured to obtain images from the imager, and identify and classify particles within the cloud using the obtained images.

DETAILED DESCRIPTION

An imaging system is disclosed herein that utilizes a short-duration, broad spectrum, light pulse to sense cloud conditions. The imaging system is implemented on an aircraft or other airborne vehicle and utilized to project the light pulses into the cloud and analyze cloud condition based upon images created by backscatter of the light pulses. The system includes a short-duration laser pulse emitter, a filter impregnated with a fluorescent dye, optics and mirrors, an imager, and processing electronics. The short-duration laser pulse is directed to the fluorescent filter, which increases the spectral content of the light beam such that a short-duration, broad spectrum, light pulse is achieved. This light pulse beam is directed through a window into the cloud using the optics and mirrors. Light is reflected back off of particles within the cloud, through the window, and directed onto the imager using the optics and mirrors. The processing electronics store and analyze the images obtained by the imager to determine characteristics of the cloud and particles within the cloud.

Figure 1:
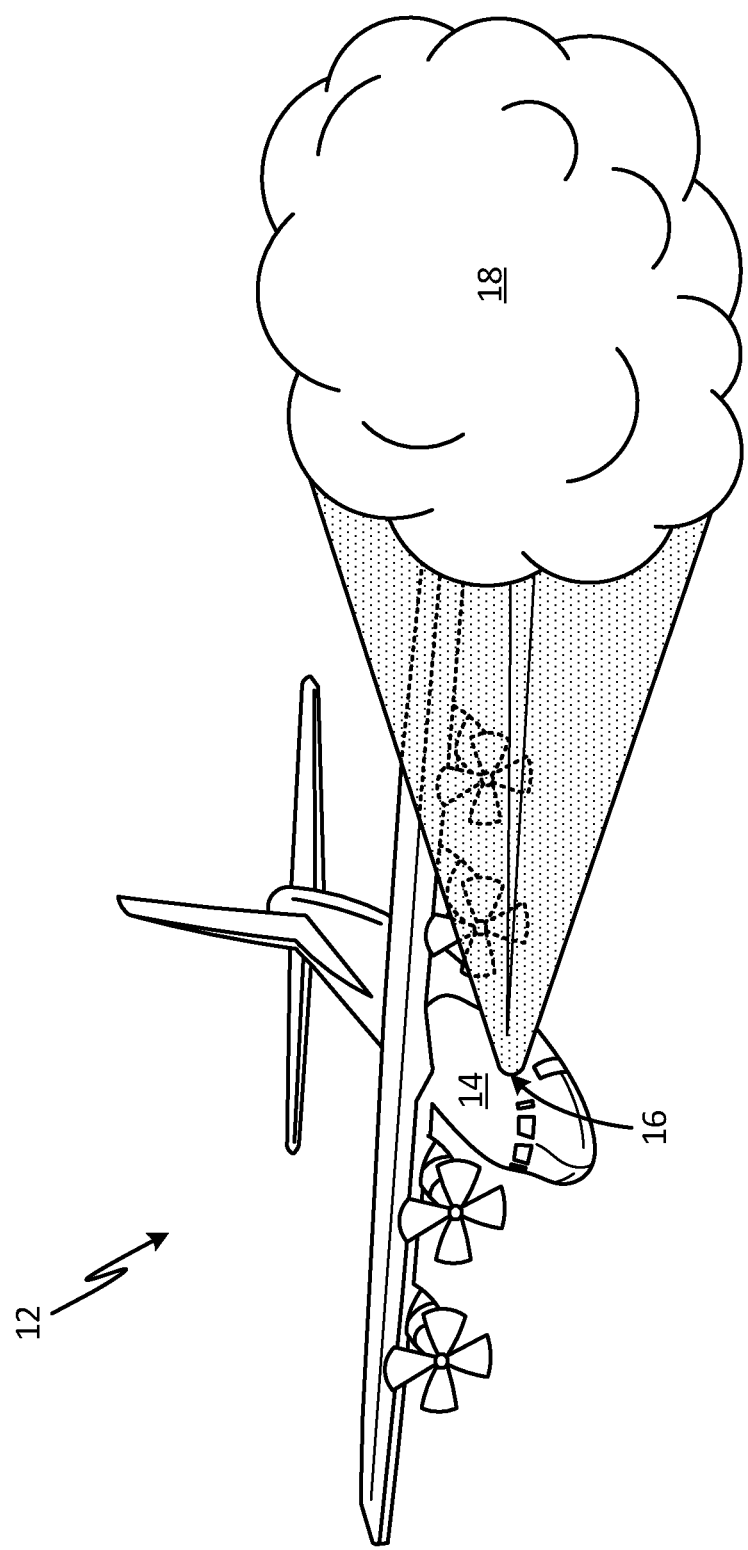
FIG. 1 is a diagram illustrating an aircraft that includes a microscopic imager.

FIG. 1 is a diagram illustrating aircraft 12 that includes a microscopic imager system 14. While illustrated as an airplane, aircraft 12 may be any airborne vehicle for which it is desirable to sense conditions of a cloud outside of the vehicle. Microscopic imager system 14 is implemented onboard aircraft 12 and is configured to project a beam of light through window 16 into cloud 18. Cloud 18 may include a variety of particles including, among others, water droplets, ice crystals, sand, dust, volcanic ash, and aerosols. These particles reflect the beam back to imager system 14 through window 16.

Of particular interest within cloud 18 are super cooled large water droplets (SLD). SLDs are of interest for aircraft 12 due to the ability of SLDs to turn quickly into accumulated ice on metallic surfaces. It is desirable to detect SLDs quickly in order to prevent ice accumulation on control surfaces of aircraft 12, for example. Aircraft 12 moves through cloud 18 at high speeds, making it desirable to use a short-duration pulse emitter. However, short-duration pulse emitters are monochromatic, which can lead to interference fringes around the droplets in obtained images of the particles. These interference fringes make detection of SLDs more difficult.

To address the appearance of interference fringes, non-monochromatic sources have been used to increase the bandwidth of the laser beam, which can reduce or eliminate the fringes around the droplets. However, by removing the monochromatic emitter, the pulse duration of the beam is increased, which is not desirable on an aircraft that travels at high speeds through cloud 18. To accommodate this, imager system 14 implements a monochromatic short-duration pulse emitter along with a fluorescent filter. The fluorescent filter increases the spectral content of the short-duration beam emitted by the monochromatic emitter. This way, the fringes may be reduced or removed while maintaining the short pulse duration.

Figure 2A:
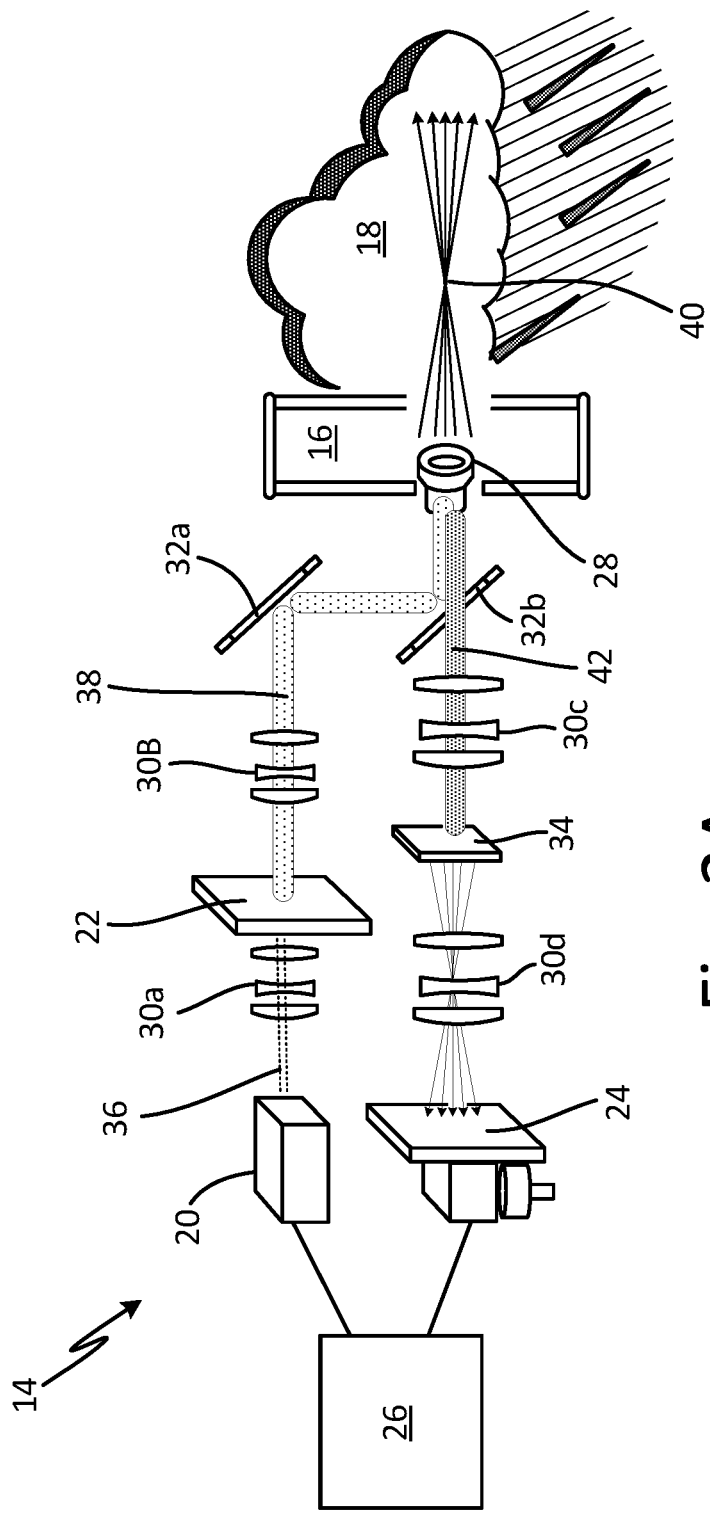
FIG. 2A is a system diagram illustrating an embodiment of a microscopic imager system.

FIG. 2A is a system diagram illustrating an example embodiment of microscopic imager system 14. Imager system 14 includes pulse emitter 20, fluorescent filter 22, imager 24, processing electronics 26, lens 28, optics 30a-30d, mirrors 32a and 32b, and filter 34.

Pulse emitter 20 may be configured to emit short-pulse, limited band, laser beam 36, and may be any suitable short-duration laser such as, for example, a neodymium-doped yttrium aluminium garnetpulse (Nd:YAG) laser. Pulse emitter 20 may emit a short-pulse green laser at 532 nm, or any other wavelength that lies toward peak absorption for typical fluorescent dies. Laser beam 36 may be focused and directed to fluorescent filter 22 by optics 30a. Fluorescent filter 22 may be a plastic or glass impregnated with a fluorescent dye. The fluorescent dye may be any dye that fluoresces over a broad band, such as rhodamine 590, for example. Light pulse 38 from fluorescent filter 22 is a light pulse that maintains the temporal nature of laser beam 36, but with an increased spectral content. In prior art systems, when using a short-pulse laser, diffraction fringes appeared in images captured of droplets within cloud 18. By increasing the spectral content of the beam, a short-pulse laser may be utilized while eliminating the undesirable diffraction fringes in the captured images.

Short-pulse, broad spectrum light beam 38 is provided to cloud 18. Beam 38 is directed to cloud 18 by optics 30b and mirrors 32a and 32b. While illustrated as directed to cloud 18 by optics 30b and mirrors 32a and 32b, beam 36 may be directed to cloud 18 through window 16 in any way. Beam 36 may be provided to cloud 18 through lens 28, for example, which may be a field of view projection lens configured to project the light pulse into cloud 18 and focus the light pulse at focal point 40, which may be a controlled distance and controlled volume within cloud 18. Focal point 40 may be any desirable distance from window 16. For example, focal point 40 may be 0.5 meters or more in order to extend beyond the boundary layer of the aircraft, which may be the layer of air that is disturbed by flight of the aircraft.

Light is scattered and reflected back through window 16 by particles within cloud 18, and the reflected light is collected by lens 28. Lens 28 directs the reflected light beam 42 through mirror 32b and optics 30c to filter 34. Mirror 32b may be implemented, for example, as a 50/50 optical beam splitter or other partially reflecting mirror such that at least a portion of beam 42 is able to pass through mirror 32b to optics 30c. Filter 34 and optics 30d may be utilized, for example, to prepare the reflected beam 42 for imager 24. Imager 24 may be a focal plane array (FPA), for example. Optics 30d may therefore be utilized to focus the light from beam 42 onto the photo-diode array of the FPA to obtain an image of particles within cloud 18.

Images are collected by processing electronics 26 using imager 24. Processing electronics 26 may be one or more onboard computer systems and may comprise one or more controllers, microprocessors, or other electronics. Processing electronics 26 may also include one or more memory systems that may be implemented as volatile and/or non-volatile memory systems. Processing electronics 26 may be connected local to imager 24, or remote from imager 24. For example, processing electronics 26 may be implemented in an avionics bay and configured to communicate with imager 24 over a wired or wireless connection. Processing electronics 26 may also be configured to receive aircraft data directly from aircraft sensors, or through other aircraft computer systems. The aircraft data may include, but is not limited to, air temperature and air speed. Processing electronics 26 may also be connected to control pulse emitter 20.

The images captured by processing electronics 26 through imager 24 may include several images of a small controlled volume within cloud 18. This volume may include many types of particles including water droplets, ice crystals, sand, dust, volcanic ash, and aerosols of varying size and shape. These images may be passed through several steps of image processing by processing electronics 26 including, but not limited to, filtering, de-noising, segmentation, and edge detection, for example. This may be followed by further signal processing to obtain particle image separation, detection, recognition, identification, classification, and sizing. While identifying and classifying particles, processing electronics 26 may also utilize received aircraft data such as air speed and air temperature. Statistics of particles detected in the monitored volume of cloud 18 over a period of time, for example, may be summarized and broadcast to an aircraft user as desired.

Figure 2B:
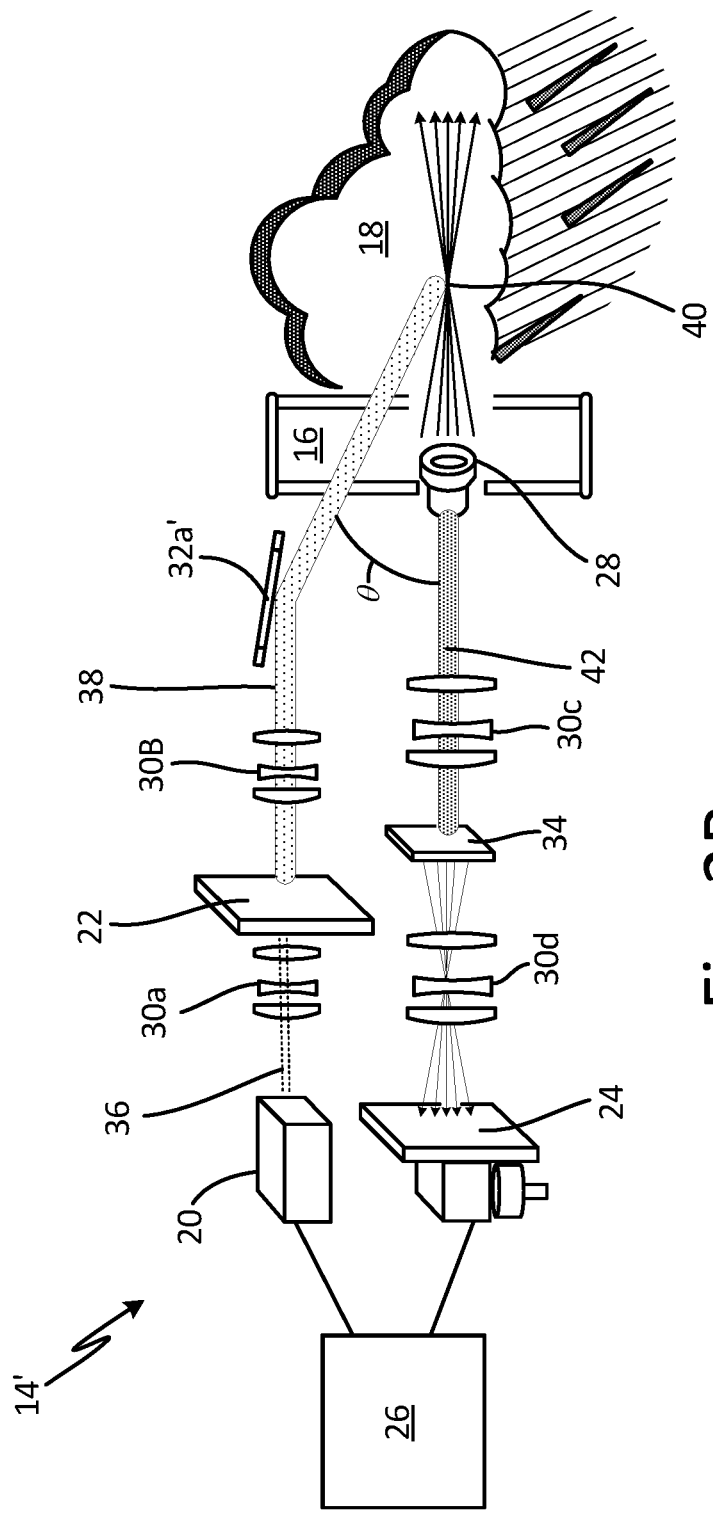
FIG. 2B is a system diagram illustrating another embodiment of a microscopic imager system.

FIG. 2B is a system diagram illustrating another embodiment of microscopic imager system 14'. In the embodiment illustrated in FIG. 2B, elements with reference numerals identical to those of FIG. 2A may operate in a substantially similar manner as those described above with respect to the embodiment of FIG. 2A.

In system 14', mirror 32' (which is in place of mirror 32a of the embodiment illustrated in FIG. 2A) is oriented to project light beam 38 out of window 16 and into cloud 18. Because of this, mirror 32b (of the embodiment shown in FIG. 2A) is no longer needed. Mirror 32' may be configured to project beam 38 through window 16 at an angle (θ) with respect to an optical axis formed by optics 30c and 30d, filter 34, and imager 24. Angle (θ) may be any angle between 0 and 90 degrees, for example, and may be selected such that the reflected light off of particles of cloud 18 is maximized. For example, angle (θ) may be selected as a "rainbow angle," which is the angle at which visible light reflects off of the droplets within cloud 18 at many/all visible wavelengths, thus allowing a greater amount of reflected light for beam 42. For angle (θ), the rainbow angle may be between 40 and 42 degrees, for example. While two embodiments are illustrated in FIGS. 2A and 2B, the optical elements of microscopic imager system 14 may be oriented in any desirable way such that beam 38 is projected into cloud 18, and reflected light 42 is provided to imager 24.

Figure 3:
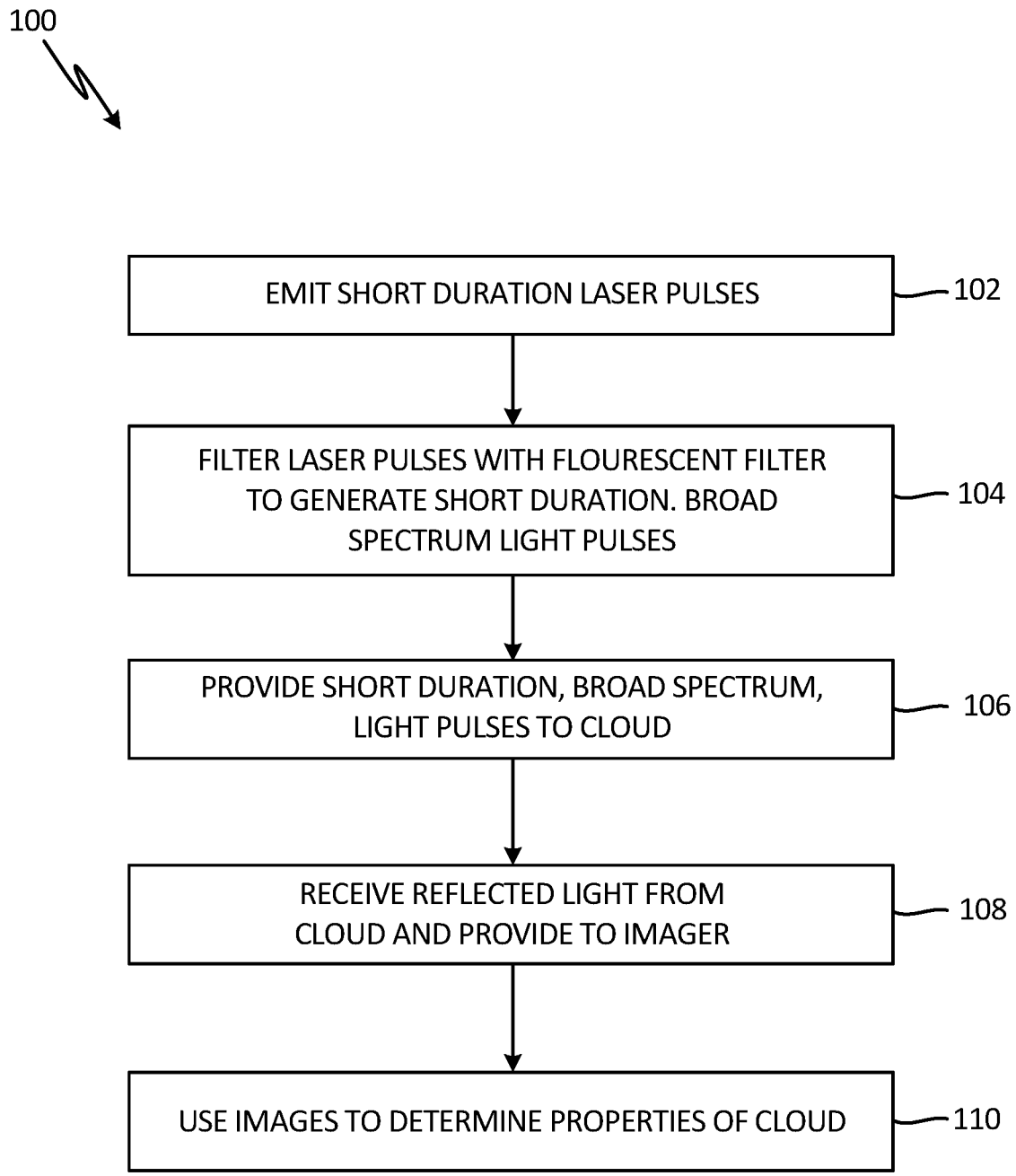
FIG. 3 is a flowchart illustrating a method of using a microscopic imager system to detect cloud conditions.

FIG. 3 is a flowchart illustrating method 100 of using a microscopic imager system to detect cloud conditions. While reference is made to FIGS. 2A and 2B, other embodiments of a microscopic imager system may be utilized with respect to method 100. At step 102, pulse emitter 20 is controlled to emit a short-duration laser pulse. The laser pulse may be a green (532 nm) laser, or any other wavelength that lies toward peak absorption for typical fluorescent dies.

Laser pulses are provided to fluorescent filter 22. At step 104, the laser pulses are converted into short-duration light pulses with an increased spectral content over the laser pulses. Fluorescent filter 22 may be glass or plastic, for example, impregnated with a fluorescent dye. The fluorescent dye may be any dye that fluoresces over a broad band, such as rhodamine 590, for example. At step 106, the light pulses are provided through window 16 to cloud 18. This may be through a focal lens that focuses the light pulses to a specific point in cloud 18, such as 0.5 meters, for example, or may be directed into cloud 18 at an angle with respect to the image capture optics and electronics in order to maximize the spectrum of the reflected light.

Light reflected off of particles within cloud 18 returns through window 16. At step 108, the reflected light is directed and focused onto imager 24, which may be a focal plane array, for example. The focal plane array provides an electronic output indicative of the reflected light at a high frame rate. For example, the output of the focal plane array may be provided at a rate between 100 Hz and 1 kHz. This is advantageous because an aircraft is moving through cloud 18 at a rapid rate and thus, being able to capture images at this rate is desirable. Because light beam 38 has a short pulse duration, imager 24 is able to be operated at the high rate. At step 110, the images captured using the focal plane array are processed to determine properties of cloud 18. For example, processing electronics may detect and classify, using the captured images and other aircraft data such as air speed and air temperature, supercooled large droplets (SLDs) within cloud 18 and alert a user of the aircraft to the presence of the SLDs.

DISCUSSION OF POSSIBLE EMBODIMENTS

The following are non-exclusive descriptions of possible embodiments of the present invention.

An imaging system for determining conditions of a cloud includes a laser emitter, a fluorescent filter, optics, and an imager. The laser emitter generates a short pulse laser beam. The fluorescent filter is configured to convert the short pulse, limited band, laser beam into a short pulse, wide band, light beam such that the spectral content of the short pulse light beam is greater than the spectral content of the short pulse laser beam. The optics are configured to direct the short pulse, wide band, light beam to the cloud, receive a reflected portion of the short pulse light beam from the cloud, and direct the reflected portion to the imager.

The system of the preceding paragraph can optionally include, additionally and/or alternatively, any one or more of the following features, configurations and/or additional components:

A further embodiment of the foregoing system, wherein the short pulse laser beam is a 532 nm laser beam, and wherein the fluorescent filter is plastic or glass impregnated with rhodamine 590 dye.

A further embodiment of any of the foregoing systems, wherein the imager is a focal plane array, and wherein the controller is configured to obtain images from the focal plane array, wherein the controller is configured to determine conditions of the cloud based upon the obtained images.

A further embodiment of any of the foregoing systems, wherein the controller is configured to perform signal processing to obtain particle image separation, detection, recognition, identification, classification and sizing.

A further embodiment of any of the foregoing systems, wherein the short pulse laser beam is directed into the cloud at a rainbow angle with respect to the imager.

A further embodiment of any of the foregoing systems, wherein the optics include a projection lens, and wherein the projection lens is configured to focus the short pulse light beam to a focal point within the cloud, and collect the reflected portion of the short pulse light beam from the cloud.

A further embodiment of any of the foregoing systems, wherein the imaging system is implemented onboard an aircraft, and wherein the short pulse light beam is provided to the cloud through a window of the aircraft.

A method of detecting conditions of a cloud includes emitting, by a laser emitter, a short pulse laser beam; converting, by a fluorescent filter, the short pulse laser beam into a short pulse, wide band, light beam having a greater spectral content than the short pulse laser beam; directing the short pulse light beam into the cloud; receiving, by optics, a reflected portion of the short pulse light beam reflected by the cloud; and directing, by the optics, the reflected portion to an imager.

The method of the preceding paragraph can optionally include, additionally and/or alternatively, any one or more of the following features, configurations and/or additional components:

A further embodiment of the foregoing method, further including generating, by the imager, images of particles within the cloud using the reflected portion; and determining, by a controller, properties of the particles within the cloud based on the images.

A further embodiment of any of the foregoing methods, wherein determining, by the controller, the properties of the particles includes performing signal processing to obtain particle image separation, detection, recognition, identification, classification, and sizing; determining statistics of the particles in a volume of the cloud over a period of time; and outputting, by the controller, the statistics.

A further embodiment of any of the foregoing methods, wherein directing the short pulse light beam into the cloud comprises directing the short pulse light beam into the cloud through a projection lens.

A further embodiment of any of the foregoing methods, wherein directing the short pulse light beam into the cloud further comprises focusing the short pulse light beam at a focal point within the cloud by the projection lens.

A further embodiment of any of the foregoing methods, wherein directing the short pulse light beam into the cloud comprises directing the short pulse light beam into the cloud at a rainbow angle with respect to the imager.

A further embodiment of any of the foregoing methods, wherein emitting the short pulse laser beam comprises a emitting the short pulse laser beam at 532 nm, and wherein the fluorescent filter is plastic or glass impregnated with rhodamine 590 dye.

A further embodiment of any of the foregoing methods, wherein the imager is a focal plane array.

An aircraft system is configured to detect conditions of a cloud. The aircraft system includes a laser emitter, a fluorescent filter, optics, an imager, and processing electronics. The laser emitter generates a short pulse laser beam. The fluorescent filter is configured to convert the short pulse laser beam into a short pulse, wide band, light beam such that the spectral content of the short pulse light beam is greater than the spectral content of the short pulse laser beam. The optics are configured to direct the short pulse light beam through a window of the aircraft into the cloud. The imager is configured to receive a reflected portion of the short pulse light beam from the cloud. The processing electronics are configured to obtain images from the imager, and identify and classify particles within the cloud using the obtained images.

The system of the preceding paragraph can optionally include, additionally and/or alternatively, any one or more of the following features, configurations and/or additional components:

A further embodiment of the foregoing system, wherein the imager is a focal plane array.

A further embodiment of any of the foregoing systems, wherein the processing electronics are configured to execute algorithms to quantify icing conditions of the cloud and detect water droplets, ice crystals, sand, dust, volcanic ash, aerosols, and super cooled large water droplets.

A further embodiment of any of the foregoing systems, wherein the optics include a projection lens, and wherein the projection lens is configured to focus the short pulse light beam to a focal point within the cloud, and collect the reflected portion of the short pulse light beam from the cloud.

A further embodiment of any of the foregoing systems, wherein the short pulse laser beam is a 532 nm laser beam and the fluorescent filter is plastic or glass impregnated with rhodamine 590 dye.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An imaging system for determining conditions of a cloud, the imaging system comprising:
   a laser emitter that generates a short pulse laser beam;
   a fluorescent filter configured to convert the short pulse laser beam into a short pulse light beam, wherein a spectral content of the short pulse light beam is greater than a spectral content of the short pulse laser beam and the spectral content of the short pulse light beam is selected to result in reduced interference fringes around super cooled large water droplets in the cloud compared to use of a short pulse laser beam; and
   optics configured to direct the short pulse light beam to the cloud, receive a reflected portion of the short pulse light beam from the cloud, and direct the reflected portion to an imager configured to detect super cooled large water droplets in the cloud.

2. The imaging system of claim 1, wherein the short pulse laser beam is a 532 nm laser beam, and wherein the fluorescent filter is plastic or glass impregnated with rhodamine 590 dye.

3. The imaging system of claim 1, wherein the imager is a focal plane array, and wherein the controller is configured to obtain images from the focal plane array, wherein the controller is configured to determine conditions of the cloud based upon the obtained images.

4. The imaging system of claim 3, wherein the controller is configured to perform signal processing to obtain particle image separation, detection, recognition, identification, classification and sizing.

5. The imaging system of claim 1, wherein the short pulse laser beam is directed into the cloud at a rainbow angle with respect to the imager.

6. The imaging system of claim 1, wherein the optics include a projection lens, and wherein the projection lens is configured to focus the short pulse light beam to a focal point within the cloud, and collect the reflected portion of the short pulse light beam from the cloud.

7. The imaging system of claim 1, wherein the imaging system is implemented onboard an aircraft, and wherein the short pulse light beam is provided to the cloud through a window of the aircraft.

8. A method of detecting conditions of a cloud, the method comprising:
   emitting, by a laser emitter, a short pulse laser beam;
   converting, by a fluorescent filter, the short pulse laser beam into a short pulse light beam having a greater spectral content than the short pulse laser beam, wherein the spectral content of the short pulse light beam is selected to result in reduced interference fringes around super cooled large water droplets in the cloud compared to use of a short pulse laser beam;
   directing the short pulse light beam into the cloud;
   receiving, by optics, a reflected portion of the short pulse light beam reflected by the cloud; and
   directing, by the optics, the reflected portion to an imager configured to detect super cooled large water droplets in the cloud.

9. The method of claim 8, further comprising:
   generating, by the imager, images of particles within the cloud using the reflected portion; and
   determining, by a controller, properties of the particles within the cloud based on the images.

10. The method of claim 9, wherein determining, by the controller, the properties of the particles comprises:
    performing signal processing to obtain particle image separation, detection, recognition, identification, classification, and sizing;
    determining statistics of the particles in a volume of the cloud over a period of time; and
    outputting, by the controller, the statistics.

11. The method of claim 8, wherein directing the short pulse light beam into the cloud comprises directing the short pulse light beam into the cloud through a projection lens.

12. The method of claim 11, wherein directing the short pulse light beam into the cloud further comprises focusing the short pulse light beam at a focal point within the cloud by the projection lens.

13. The method of claim 8, wherein directing the short pulse light beam into the cloud comprises directing the short pulse light beam into the cloud at a rainbow angle with respect to the imager.

14. The method of claim 8, wherein emitting the short pulse laser beam comprises emitting the short pulse laser beam at 532 nm, and wherein the fluorescent filter is plastic or glass impregnated with rhodamine 590 dye.

15. The method of claim 8, wherein the imager is a focal plane array.

16. An aircraft system configured to detect conditions of a cloud, the aircraft system comprising:
    a laser emitter that generates a short pulse laser beam;
    a fluorescent filter configured to convert the short pulse laser beam into a short pulse light beam, wherein the spectral content of the short pulse light beam is greater than the spectral content of the short pulse laser beam and the spectral content of the short pulse light beam is selected to result in reduced interference fringes around super cooled large water droplets in the cloud compared to use of a short pulse laser beam; and
    optics configured to direct the short pulse light beam through a window of the aircraft into the cloud;
    an imager configured to receive a reflected portion of the short pulse light beam from the cloud; and
    processing electronics configured to obtain images from the imager, wherein the processing electronics are further configured to identify and classify particles within the cloud using the obtained images.

17. The aircraft system of claim 16, wherein the imager is a focal plane array.

18. The aircraft system of claim 16, wherein the processing electronics are configured to execute algorithms to quantify icing conditions of the cloud and detect water droplets, ice crystals, sand, dust, volcanic ash, aerosols, and super cooled large water droplets.

19. The aircraft system of claim 16, wherein the optics include a projection lens, and wherein the projection lens is configured to focus the short pulse light beam to a focal point within the cloud, and collect the reflected portion of the short pulse light beam from the cloud.

20. The aircraft system of claim 16, wherein the short pulse laser beam is a 532 nm laser beam and the fluorescent filter is plastic or glass impregnated with rhodamine 590 dye.

21. The imaging system of claim 7, wherein the optics further comprise a lens configured to focus the short pulse light beam through the window of the aircraft into the cloud at a focal point that is beyond a boundary layer of the aircraft in flight.

22. The imaging system of claim 21, wherein the focal point is 0.5 m or more from the window.

23. The method of claim 12, wherein focusing the short pulse light beam at a focal point within the cloud by a projection lens further comprises focusing the short pulse light beam through a window of an aircraft at a focal point in the cloud that is beyond a boundary layer of the aircraft in flight.

24. The method of claim 23, wherein the focal point is 0.5 m or more from the window.

25. The aircraft system of claim 19, wherein the projection lens is configured to focus the short pulse light beam through the window of the aircraft into the cloud at a focal point that is beyond a boundary layer of the aircraft in flight.

26. The aircraft system of claim 25, wherein the focal point is 0.5 m or more from the window.

* * * * *